Oct. 27, 1925. 1,558,783
W. F. BLEECKER
PROCESS OF REPAIRING CONCRETE
Filed July 22, 1922
Fig. 1.
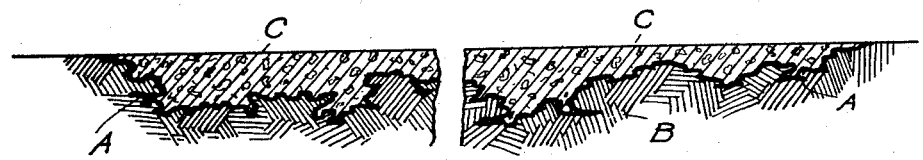
Fig. 2.
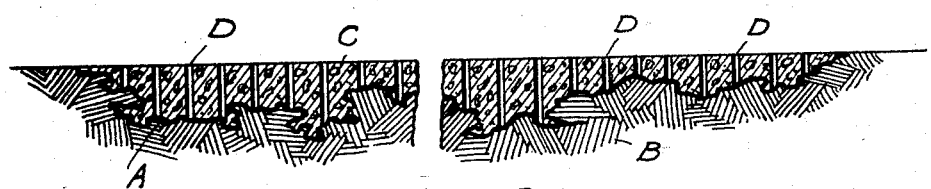
Fig. 3.
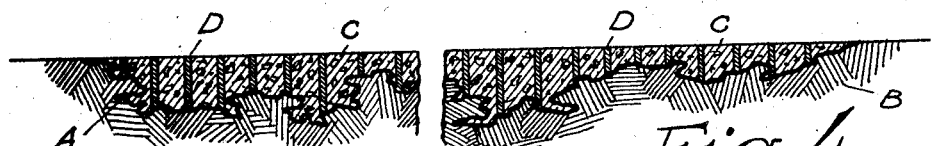
Fig. 4.
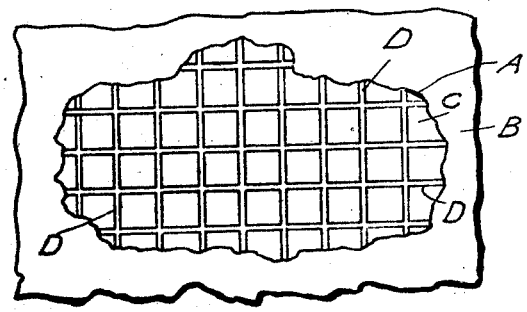
Fig. 5.
INVENTOR.
W. F. Bleecker.
BY
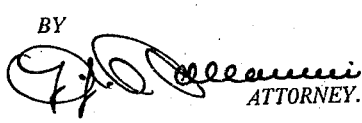
ATTORNEY.

Patented Oct. 27, 1925.

1,558,783

UNITED STATES PATENT OFFICE.

WARREN F. BLEECKER, OF BOULDER, COLORADO.

PROCESS OF REPAIRING CONCRETE.

Application filed July 22, 1922. Serial No. 576,888.

*To all whom it may concern:*

Be it known that I, WARREN F. BLEECKER, a citizen of the United States, residing at Boulder, in the county of Boulder and State of Colorado, have invented certain new and useful Improvements in Processes of Repairing Concrete, of which the following is a specification.

This invention relates to a process of repairing pavements and other structures and its principal object is to provide a simple method of filling broken, sunken or otherwise defective portions of a surface so that the filling becomes an integral part of the surrounding old material, and remains permanently in adherent connection with the bounding edge thereof.

My invention is particularly adapted for use in repairing concrete pavements and presents a simple solution for the difficulties heretofore encountered in work of this character.

By the use of my invention the new concrete surface is adpated to withstand the stresses of heavy travel as well as the older pavement to which it is applied and it is prepared for independent expansion and contraction during its drying and setting period, thereby preventing undue strain at its juncture with the old material and permanently retaining its intimate connection therewith.

With the above and other objects in view, my improved process consists in a sequence of steps or actions set forth in detail in the course of the following description with reference to the accompanying drawing.

The initial step of the process consists in thoroughly cleaning the surface to be repaired by the removal of all matter which might interfere with the adhesion of the fresh material at every point of the area over which it is applied. I attain this result by first brushing the broken surface for the removal of loose matter and then washing it with a weak solution of acid in water, hydrochloric acid being preferred.

The acid dissolves the calcium silicate, calcium carbonate and other acid-soluble matter from the broken surface and forms calcium chloride which is readily removed by flushing the surface with water.

The cleaned surface is now coated with a thin emulsion of pure cement preferably applied by means of a stiff brush which causes the cement to enter into the crevices, pores and capillary passages which are open at the surface.

After the surface and its intercellular spaces have thus been completely coated, the space above the surface is filled with a concrete mixture to the level of the surrounding old material. The concrete readily adheres to the cement coating and before the wet mass has dried and set, it is divided by a reticulation of intersecting narrow slits which may be produced with a knife or trowel, by the use of dividing plates or in any other suitable manner.

The slits or incisions which are best made about the time the concrete takes its first set or about thirty minutes after the surface has been finished, permit of the contraction of the fresh material without strain on the juncture of the new material with the old. The contraction joints produced by the intersecting incisions are a very essential feature since without them the natural shrinkage of the newly applied cement mixture would result in forming innumerable small fractures along the line of least resistance, that is the juncture of the new material with the old material, since the latter, having previously undergone the changes in dimensions due to contraction, provides an unyielding mass. By forming the joints close together the new surface is divided into a number of small units each of which is capable of contraction independent of the others and with the result that the tendency of the entire mass to separate from the surrounding material by contraction is reduced to a minimum.

After the mass has stood for about twenty-four hours, during which time the maximum contraction has taken place, the surface is finished with a rich cement mixture which fills the cracks or contraction joints and thus completes the plastic filling into a homogeneous mass which becomes a solid and permanently adherent part of the material in which and to which it is formed.

In the drawings, Figure 1 represents a section of the broken surface drawn to an exaggerated scale, showing the application of the cement coating A to the previously cleaned surface B;

Figure 2 is a similar section after the surface has been filled with a concrete mixture C;

Figure 3 represents the same section after the fresh material has been divided by intersecting slits D;

Figure 4 shows a similar section showing the surface after its contraction joints have been filled; and Figure 5 is a plan view of the divided area.

It is advisable that the surface to be repaired or resurfaced be thoroughly wet in order that no moisture be drawn from the fresh material during the setting process, and that the usual precaution of keeping the concrete moist for a period of days, be observed.

Having thus described my process, what I claim and desire to secure by Letters-Patent is:—

1. The process of repairing concrete or cement structures consisting in cleaning a broken surface of the structure, then filling the space above said surface with a concrete mass, and dividing the mass by contraction grooves to but not through the surface of the structure.

2. The process of repairing concrete or cement structures consisting in cleaning a broken surface of the structure, then filling the space above said surface with a concrete mass, dividing the mass by contraction grooves to but not through the surface of the structure, and filling the grooves after the mass has hardened in place.

3. The process of repairing concrete or cement structures consisting in cleaning a broken surface of the structure, then coating the cleaned surface with a fluid layer of cement, then filling the space above the coated surface with a concrete mass, and dividing said mass by contraction grooves to but not through the coated surface of the structure.

In testimony whereof I have affixed my signature.

WARREN F. BLEECKER.